(12) United States Patent
Bregman-Amitai et al.

(10) Patent No.: US 8,797,353 B2
(45) Date of Patent: Aug. 5, 2014

(54) AUGMENTED MEDIA MESSAGE

(75) Inventors: Orna Bregman-Amitai, Tel-Aviv (IL); Eyal Toledano, Kiryat Ata (IL); Eduard Oks, Bat-Yam (IL); Amir Shaham, Givat Shmuel (IL); Yuri Arshavski, Netanya (IL); Rami Gil, Tel Aviv (IL)

(73) Assignee: Samsung Electronics Co., Ltd., Gyeonggi-do (KR)

(*) Notice: Subject to any disclaimer, the term of this patent is extended or adjusted under 35 U.S.C. 154(b) by 852 days.

(21) Appl. No.: 12/791,041

(22) Filed: Jun. 1, 2010

(65) Prior Publication Data

US 2011/0201362 A1   Aug. 18, 2011

Related U.S. Application Data

(60) Provisional application No. 61/304,062, filed on Feb. 12, 2010.

(51) Int. Cl.
*G09G 5/00* (2006.01)
*H04N 1/00* (2006.01)
*G06T 19/00* (2011.01)
*H04W 4/00* (2009.01)

(52) U.S. Cl.
CPC ............ *H04W 4/00* (2013.01); *H04N 1/00323* (2013.01); *G06T 19/006* (2013.01)
USPC ........................................................ 345/633

(58) Field of Classification Search
CPC ................................ G06T 19/006; G06F 3/14
USPC ................................ 348/135; 455/456.3, 556
See application file for complete search history.

(56) References Cited

U.S. PATENT DOCUMENTS

| 8,307,029 | B2* | 11/2012 | Davis et al. | 709/203 |
| 8,400,548 | B2* | 3/2013 | Bilbrey et al. | 348/333.01 |
| 2009/0061901 | A1* | 3/2009 | Arrasvuori et al. | 455/456.3 |
| 2010/0066750 | A1* | 3/2010 | Yu et al. | 345/581 |
| 2010/0194782 | A1* | 8/2010 | Gyorfi et al. | 345/633 |
| 2010/0208057 | A1* | 8/2010 | Meier et al. | 348/135 |

* cited by examiner

*Primary Examiner* — Kee M Tung
*Assistant Examiner* — Nicole Gillespie
(74) *Attorney, Agent, or Firm* — Roach Brown McCarthy & Gruber, P.C.; Kevin D. McCarthy

(57) ABSTRACT

A method for generating and viewing on a handheld device a 3-D augmented reality feature containing a rich media message that is linked to a physical object comprises the steps of: a) by a first user: i. Taking a picture of a physical object; ii. selecting an augmented reality theme; iii. attaching the rich media animated object to the image taken, in the desired position and location on the physical object; iv. generating a reach media message from the augmented reality image obtained in step (iii); iv. optionally attaching an additional file to the rich media message; v. Transferring the physical object to a second user; and vi. sending to said second user a message via a communication channel, which contains the augmented reality rich media; b) by the second user (the recipient): vii. viewing the physical object received from the first user, using an AR viewer in the mobile phone camera, thereby to see the augmented reality rich media appearing on said physical object.

16 Claims, 8 Drawing Sheets

AUGMENTED MEDIA MESSAGE

REFERENCE TO CO-PENDING APPLICATION

This application claims priority to U.S. provisional patent application Ser. No. 61/304,062; filed on Feb. 12, 2010.

FIELD OF THE INVENTION

The present invention relates to the coupling of an augmented reality (AR) feature with a physical object. More particularly, the invention relates to the generation and viewing on a handheld device, particularly a cellular phone, of a 3-D augmented reality feature containing a rich media message that is linked to a physical object.

BACKGROUND OF THE INVENTION

Augmented Reality images have become popular in recent times. They essentially consist of images taken by a camera, which have been "augmented" by the addition of visible features, such as objects taken from the file or a database, or invisible features, such as metadata relating to the image, e.g., GPS data.

The Wikipedia (http://en.wikipedia.orgiwiki/Augmented_reality) defines "Augmented Reality" as follows:

"Augmented reality (AR) is a term for a live direct or indirect view of a physical real-world environment whose elements are augmented by virtual computer-generated imagery. It is related to a more general concept called mediated reality in which a view of reality is modified (possibly even diminished rather than augmented) by a computer.

In the case of Augmented Reality, the augmentation is conventionally in real-time and in semantic context with environmental elements, such as sports scores on TV during a match. With the help of advanced AR technology (e.g. adding computer vision and object recognition) the information about the surrounding real world of the user becomes interactive and digitally usable. Artificial information about the environment and the objects in it can be stored and retrieved as an information layer on top of the real world view."

AR viewers are available for different camera devices. An example of such a viewer that can be used on an iPhone is that released by Intelligent Gadgets (http://intelligentgadgets.us/arViewer/arViewer.html). Although AR viewers have been developed, their use requires adopting solutions based on markers, which require placement of a predefined marker or coded object in the environment. This kind of viewers limits the use of AR to such predefined objects. The abovementioned iPhone application does not enable real image analysis, but rather is based on a point of view and GPS location and, therefore, it cannot be used in situations in which no marker is provided.

The prior art does not provide for an application suitable to transfer a Rich Media Message (RMM) that has a reference to a specific physical object using AR data, which contains the reference image (I0). The usage of related information regarding the image, compass data and accelerometer allows the application to operate in low light and low stability conditions both at the sending and at the receiving end.

It is therefore an object of the invention to provide an efficient and more generally applicable method and system by which a user generates a 3-D augmented reality feature containing a rich media message that is linked to a physical object.

It is another object of the invention to provide an improver AR image that can be transferred with or without an attached message.

It is a further object of the invention to provide a simple and efficient method to view augmented reality messages that are linked to a physical object.

It is a further object to provide a method and system that can operate in a variety of conditions, such as marker-less physical object, fast movement of the camera and various light conditions typical to handheld device usage.

It is still another object of the invention to provide a method for generating and viewing 3-D augmented images that can be implemented using the limited computing resources of handheld devices, such as cellular phones.

Other purposes and advantages of the invention will become apparent as the description proceeds.

SUMMARY OF THE INVENTION

The invention is related to a method for generating and viewing on a handheld device a 3-D augmented reality feature containing a rich media message that is linked to a physical object, comprising the steps of:

a) by a first user:
i. Taking a picture of a physical object;
ii. selecting an augmented reality theme;
iii. attaching the rich media animated object to the image taken, in the desired position and location on the physical object;
iv. generating a rich media message from the augmented reality image obtained in step (iii);
iv. optionally attaching an additional file to the rich media message;
v. Transferring the physical object to a second user; and
vi. sending to said second user a message via a communication channel, which contains the augmented reality rich media;

b) by the second user (the recipient):
vii. viewing the physical object received from the first user, using an AR viewer in the mobile phone camera, thereby to see the augmented reality rich media appearing on said physical object.

A typical handheld device to be used in the method of the invention is a cellular phone.

According to one embodiment of the invention selecting an augmented reality theme includes using a preloaded file available in the handheld device and/or downloading it from a remote location. Furthermore, the invention envisages, if desired, also attaching an additional file to the augmented reality image, which can be selected, for instance, from music files, text files and other personal message files.

In one embodiment the invention comprises using sensor data and image processing techniques to improve the accuracy of the positioning of the augmented reality features on the physical object, said sensors being, for example, one or more of accelerometers, compasses or combinations thereof.

The invention also encompasses a handheld device comprising software for receiving data from sensors provided therein and to analyze such data and, in combination with image processing software, for improving the accuracy and speed of viewing of an augmented reality rich media on a physical object.

DETAILED DESCRIPTION OF THE INVENTION

The invention provides a method of transferring and receiving messages using a handheld device and presented in an Augmented Reality (or alternative rich media) over physical objects. For the purpose of the following description reference will be made to a cellular phone as the representative handheld device, it being understood that the invention is not limited to any particular handheld device and is applicable to any such device that is provided with the required camera and, as needed, additional sensors.

The invention will be explained through the following illustrative example of an embodiment thereof, with reference to FIG. 1 (a to c), which shows the three stages of the creation of an augmented reality image.

Stage 1—Creation of a Rich Media Message

Figure 1:
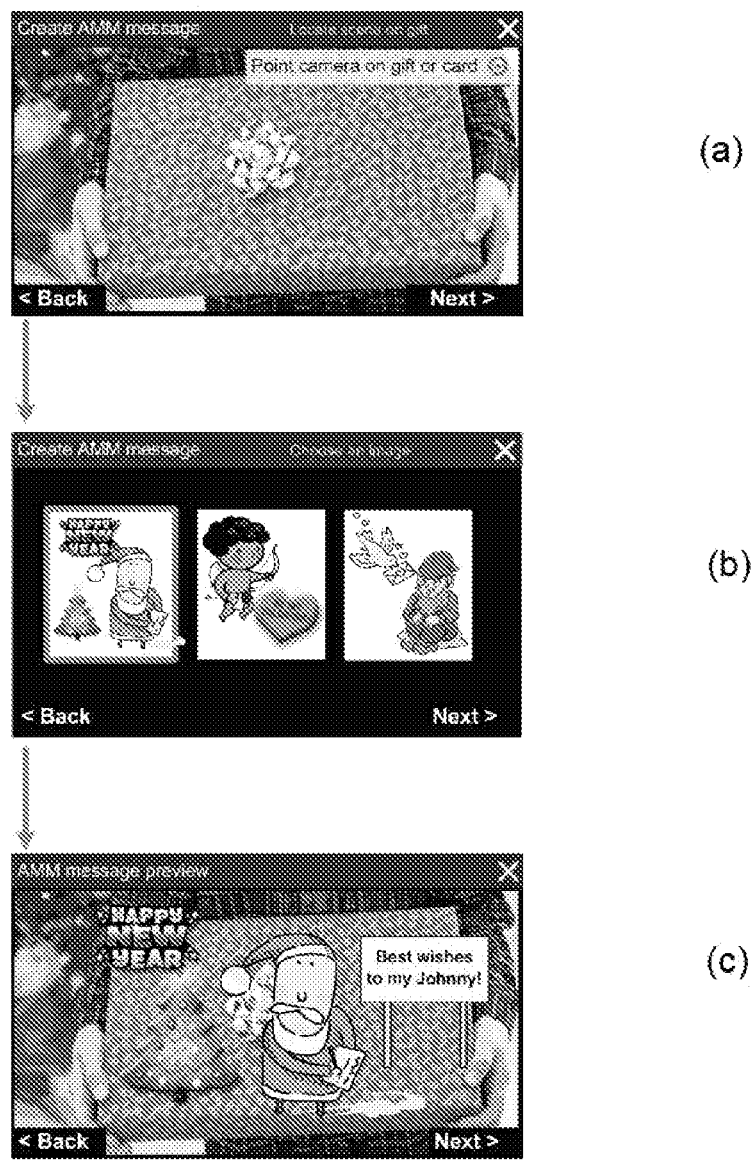
FIG. 1 illustrates the creation of an augmented reality image linked to a physical object, according to one embodiment of the invention.

As is seen in FIG. 1($a$), User A takes a picture of a physical object (a wrapped gift in this example). The user then selects an augmented reality theme (FIG. 1($b$)), either from a pre-loaded file available in his phone, or by downloading it from a remote location. User A then attaches the rich media animated object using a script to the image taken, in the position/location he chooses on the physical object. In the example of FIG. 1 ($c$) User A also attached a personal text message, using standard embedded phone applications or through suitable software that may be associated with the augmented reality theme, or may be independently provided in his cellular phone. The user may also control the placement, orientation and scale of the augmented 3D message.

User A has then the option of attaching a further music file, text, etc. (personal message) to the rich media message (RMM).

Stage 2—Transferring the Physical Object to the Recipient and Sending him Rich Media User A transfers the actual physical object to User B in any way (e.g. via mail), and also sends him a message via SMS, email or any other communication channel, including direct download from the web, which contains the rich media. This message contains the procedural description that will enable assembling the rich media to the actual object, which includes the definition of a 3D virtual scene relative to the physical object reference coordinates, the physical object reference images, and their associated transformations. This information enables the detection of the physical object and the initialization of marker-less camera tracking, with respect to the proper physical object coordinates system. The tracked camera coordinates and parameters are then used to render the given 3D virtual scene on top of the viewed physical object.

Stage 3—Viewing the RMM

Figure 2:
FIG. 2 illustrates the viewing by a recipient of the augmented reality image of FIG. 1, in relation to the physical object.

As seen in FIG. 2, User B looks at the physical object using an AR viewer in the mobile phone camera, and sees the rich media from any angle. Both users can edit the rich media animation presented to a video application and share the video among any other video supporting device Thus, every viewing user can generate a video of the viewing session that contains the captured images and the AR attached.

In order to improve the view of the rich media by User B, in one embodiment of the invention, suitable software is provided that receives data from sensors provided in the cellular phone (e.g. accelerometers) and analyzes such data. Combining sensor data and image processing techniques enable the efficient, quick and accurate viewing of the rich media. According to this embodiment of the invention, an initial (rough) calculation is performed, based on the sensors to determine the location of the augmented reality on the physical object, and then a finer tune calculation is performed using the image processing mechanism.

In one embodiment of the invention said initial calculation is based on 3× axes accelerometers and compass (or 3× axes magnetometers) information. Such information allows to compute the current rotation and to simplify the calculation of the generated virtual object placement and orientation. Such procedure is very important, for the real time handheld device AR, when only a limited device computing resources are available, and there may problematic light conditions and camera motion blur.

The invention integrates both image processing and device's inertial sensors, to enable fast enough camera tracking that is applicable also in such conditions where feature tracking alone is not sufficient. In order to appreciate the importance of this integration the use made of the navigation system integral with the handheld device will be illustrated below.

Figure 3:
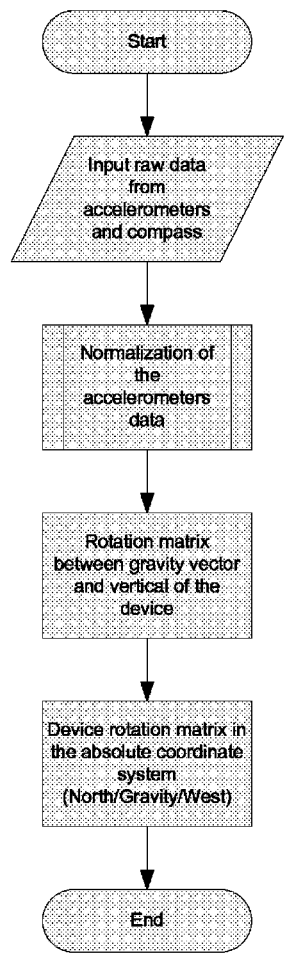
FIG. 3 illustrates the calculation of the device rotation matrix (Ma) in the absolute unmoving coordinate system.
Figure 4A:
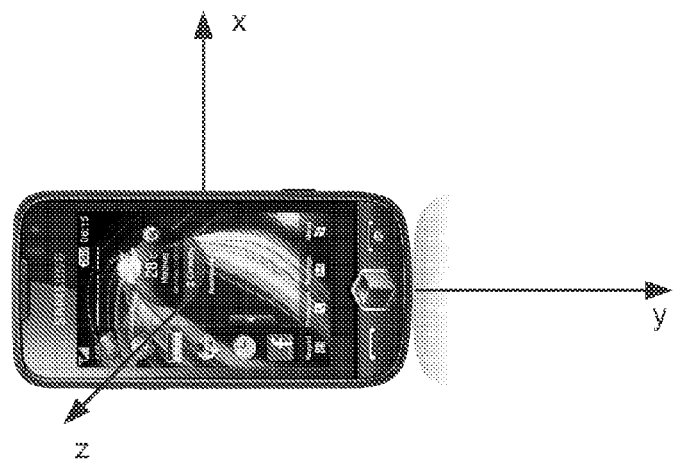
FIG. 4 shows the accelerometers coordinate system (FIG. 4A) and the display coordinate system (FIG. 4B)
Figure 4B:
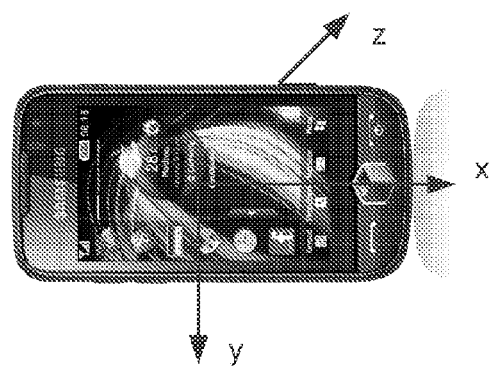
Figure 5A:
FIG. 5 (A through G) illustrates through screen shots the various stages of preparation of an AR message.
Figure 5B:
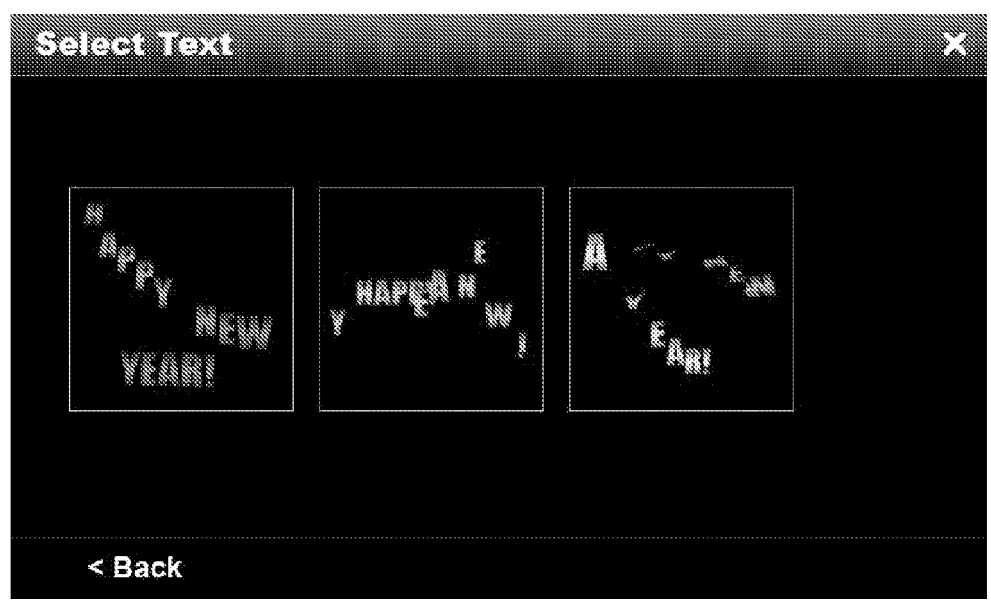
Figure 5C:
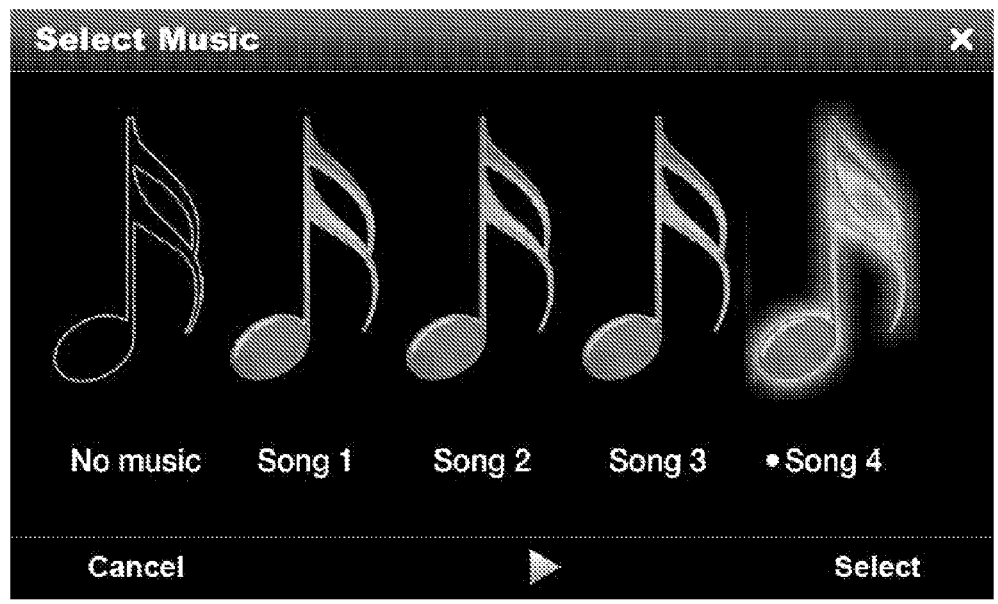
Figure 5D:
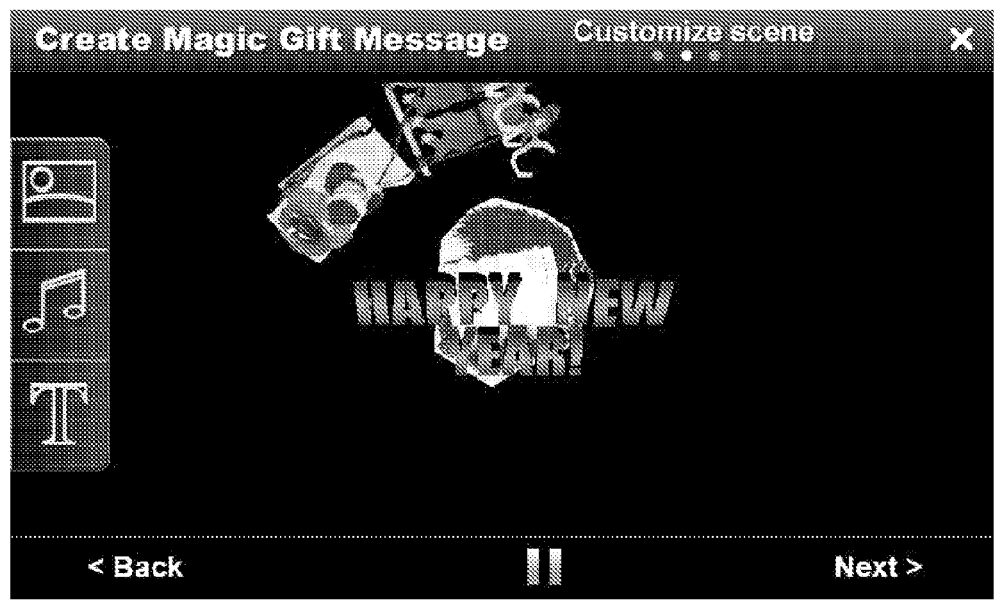
Figure 5E:
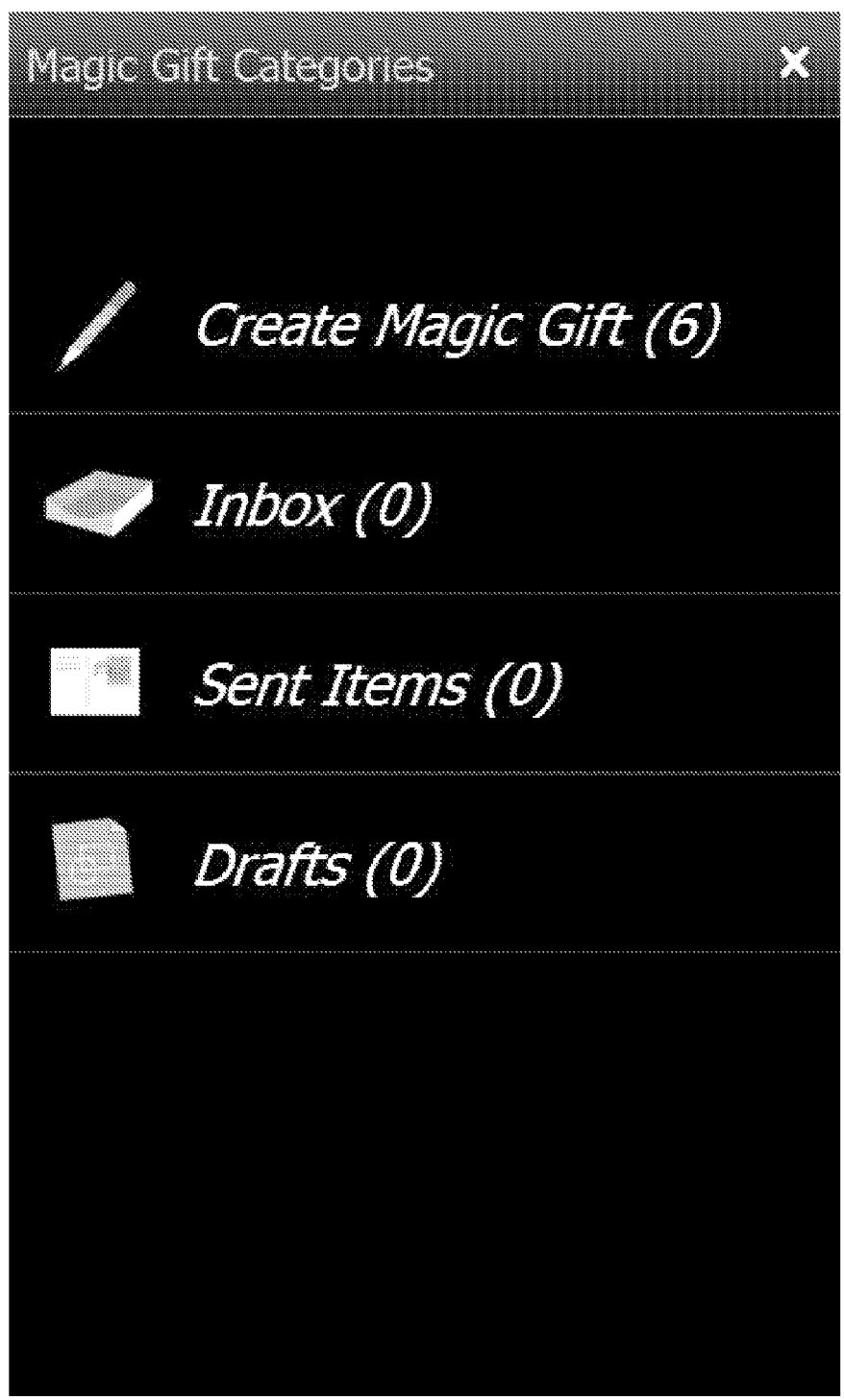
Figure 5F:
Figure 5G:

The Navigation system's target is the calculation of the device rotation matrix (Ma) in the absolute unmoving coordinate system (FIG. 3). Such coordinates system can by defined as three orthogonal axes. The first is the direction of the gravity force, second one is the direction to the North and the third has been assumed as cross product of the first and of the second.

The navigation system contains 3 axes accelerometers (Ax, Ay,Az) and 3.times. axes magnetometers. The magnetometer block contains also the DSP which calculates the device direction (D).

The 3× axes accelerometer block coordinate system is not necessarily consistent with the display coordinate system (i.e., the X axis of the display is relevant to the orientation of the Y axis of the accelerometer, the Y axis of the display is oriented opposite to the X axis of the accelerometer and the Z axes are opposed to one another).

Accelerometer Value Calculation

Every accelerometer value can be represented as the offset (Ao), gain (Ag) and the relative (Ar) value:

$$Ar=(Ain-Ao)*Ag; \text{ where } Ain\text{-input raw data.}$$

As the accelerometer and display system coordinates are not equivalent, the 3× axes accelerometer vector should be transformed into the vector ($V_a$) in the display coordinates system.

$$V_a=[A_r^y, -A_r^x, -A_r^z];$$

The normalized accelerometer vector is $$V_a^n=V_a/V_a^m; \text{ where } V_a^m \text{ is the maximum of } |V_a|;$$

The rotation matrix (M) between vectors of the gravity force $$Vg=[0\ 0\ 1]';$$

and accelerometer vector $V_a^n$ has been calculated through the quaternion (Qr) computing.

Calculation of Rotation Matrix Between Vector Gravity and Accelerometers Vector

The rotation matrix is $$M = \begin{vmatrix} m_{11} & m_{12} & m_{13} \\ m_{21} & m_{22} & m_{23} \\ m_{31} & m_{32} & m_{33} \end{vmatrix};$$

where $m_{ij}$ calculated as $m_{11} = c + x^* x^* (1-c);$ $m_{12} = x^* y^* (1-c) - s^* z;$ $m_{13} = x^* z^* (1-c) + s^* y;$ $m_{21} = y^* x^* (1-c) + s^* z;$ $m_{22} = c + y^* y^* (1-c);$ $m_{23} = y^* z^* (1-c) - s^* x;$ $m_{31} = z^* x^* (1-c) - s^* y;$ $m_{32} = z^* y^* (1-c) + s^* x;$ $m_{33} = c + z^* z^* (1-c);$ Qr=[Qc; Θ]; where Qc is cross product and Θ is dot product of two vectors.

$Qc = V_a^n \times Vg;$ $\Theta = V_a^n \cdot Vg;$ $x = Qc(1); y = Qc(2); z = Qc(3);$ $c = \cos(\Theta);$ $s = \sin(\Theta);$ Calculation of Rotation Matrix in the Absolute Unmoved Coordinates System (North/Gravity/West)

The angle between the projection of the accelerometer vector to the horizontal plane and compass direction D is calculated as $Az = -\pi + \arctg((S^* m_{11} - C^* m_{21})/(-C^* m_{22} + S^* m_{12}));$ where:
C=cos(D);
S=sin(D);
Absolute Rotation Matrix $Ma = (Rz^* M)^{-1};$ where $$Rz = \begin{vmatrix} \cos(Az) & \sin(Az) & 0 \\ -\sin(Az) & \cos(Az) & 0 \\ 0 & 0 & 1 \end{vmatrix};$$

Example

Learning Stage:

In this stage the user views the physical object he would like to send the message for. Several preview frames are saved and then for the best quality frames (sharp features) the projection transformation from the object to the image is calculated. For a chosen graphic message, which is represented as a graphic virtual scene, a normalization factor is calculated with the possible aid of the user to control the virtual object size orientation and position above the physical object. Based on these normalized coordinates the reference image camera position is evaluated and stored as part of the reference data.

View Stage:

The data that is available in the view stage include a reference image, its related camera transform, in the normalized graphic scene, and the graphic scene itself (the AR message). As explained later, the graphics scene may include several options for interactive usage according to the viewing camera orientation and position, and user operations. The reference image is used to detect and confirm the physical object identity (e.g. present), and relative transformation in the first captured good quality image. Based on this relative transform, the camera tracking is corrected to reflect the correct camera movement with respect to the graphics scene.

The tracked camera transform is used to create a virtual graphics camera to view the scene message on top of the physical object preview image in the same way it was set by the message sender.

The Tracking Process

The tracking process integrates several algorithms to maintain a robust camera tracking even in the presence of difficult conditions such as broad lighting conditions, fast camera movement and insufficient image features. The process supports marker-less physical objects.

The process uses a feature match algorithm to detect the object and its relative transformation with no prior transformation knowledge, to enable correct detection of the physical object and initializing the tracking process, as well as to recover track losses or drifts. Additional fast frame-to-frame process uses a fusion of the available device inertial sensors for 3D rotation estimation and a fast correlation based algorithm. The correlation algorithm identifies high frequency regions in the image in an adaptive way and uses the correlation of these features integrated on the whole image, to find an image match and resolve the full camera 6 DOF transform complementing the sensor's detection.

This approach reduces the need for locally sharp image features that is required by image only-based trackers, which use local feature tracking alone. This is particularly important in bad light conditions and fast movement that are typical to a handheld device. Nevertheless in addition, a feature tracking approach can be applied to aid the tracking The fusion of several algorithms and transformation measure sources help also to adapt the algorithm configuration according to the device hardware and processing capabilities.

FIG. 5, which is self explanatory, illustrates through screen shots the various stages of preparation of an AR message.

In addition to the above-described operations, additional options are available through the invention, and some illustrative options are briefly described hereinafter to illustrate this point.

Renewing Animation—as the AR and object are separated it is possible to update the RMM so that it changes over time in a predetermined manner or simply via later editing.

Showing different features from different angles—the animation can be built such that it shows different features if the viewing angle is changed.

Triggering effect—"hot spots" can be embedded in the RMM so that touching them may trigger an effect.

RMM transfer—It is possible to transfer the RMM to a different physical present.

Remixing the RMM—changing the text when sending it forward to another user.

Automatic Identification of the RMM—When receiving the RMM, once the user looks at the physical present the correct RMM automatically starts to operate. So if for example the user will has 20 RMMs, only one will be synchronized to the specific physical present.

All the above description has been given for the purpose of illustration and is not meant to limit the invention in any way, except as defined in the claims to follow.

The invention claimed is:

1. A method for generating and viewing on a handheld device a 3-D augmented reality feature that is linked to a physical object, comprising the steps of:
   (a) capturing a reference image of a physical object having a high frequency region with a handheld device having a plurality of inertial sensors and an image processor;
   (b) capturing, with said handheld device, a sequence of additional images of said object; and
   (c) for each of said captured additional images, performing the following steps by said image processor:
      i) identifying said high frequency region;
      ii) calculating a correlation in terms of relative distance and orientation in six degrees of freedom between said high frequency region in said additional image to said high frequency region in said reference image by integrating rotational data derived from said plurality of inertial sensors with translational data derived from features extracted from said captured object;
      iii) determining a relative transformation from said reference image to said additional image based on said calculated correlation; and
      iv) attaching a selected augmented reality feature to said captured object in response to said determined relative transformation, to generate an augmented object of said feature appearing on said captured object.

2. The method according to claim 1, further comprising the step of transferring the augmented object to a second user.

3. The method according to claim 2, wherein the second user views the transferred augmented object using an augmented reality viewer provided in a handheld device.

4. The method according to claim 2, further comprising the step of creating a rich media message by attaching a personal text message to the generated augmented object prior to transferring the augmented object to the second user.

5. The method according to claim 4, further comprising attaching an additional file to the created rich media message.

6. The method according to claim 5, wherein the additional file is selected from music files, text files and other personal message files.

7. The method according to claim 1, wherein the handheld device is a cellular phone.

8. The method according to claim 1, wherein the augmented reality feature is selected from a preloaded file available in the handheld device.

9. The method according to claim 1, wherein the augmented reality feature is downloaded from a remote location.

10. The method according to claim 1, wherein the physical object is captured by markerless tracking.

11. The method according to claim 1, wherein different features of the augmented object are shown upon changing its viewing angle.

12. A handheld device for generating a 3-D augmented reality feature that is linked to a physical object, comprising:
   (a) a camera for capturing a plurality of images of a selected physical object including a reference image having a high frequency region, and a sequence of additional images;
   (b) a plurality of inertial sensors for generating rotational data related to said captured object; and
   (c) an image processor for extracting features from said captured object to determine thereby translational data,
   wherein said image processor is further operable to, for each of said captured additional images:
      (i) identify said high frequency region;
      (ii) calculate a correlation in terms of relative distance and orientation in six degrees of freedom between said high frequency region in said additional image to said high frequency region in said reference image by integrating rotational data derived from said plurality of inertial sensors with translational data derived from said extracted features;
      (iii) determine a relative transformation from said reference image to said additional image based on said calculated correlation;
      (iv) attach a selected augmented reality feature to said captured object in response to said determined relative transformation; and
      (v) generate an augmented object of said feature appearing on said captured object.

13. The handheld device according to claim 12, which is further operable to create a rich media message by attaching a personal text message to the generated augmented object prior to transferring the augmented object to a second user.

14. The handheld device according to claim 12, further comprising an augmented reality viewer for viewing an augmented object transferred from another handheld device.

15. The handheld device according to claim 12, which is a cellular phone.

16. The handheld device according to claim 12, wherein each inertial sensor is an accelerometer.

* * * * *